United States Patent [19]

Hirose

[11] Patent Number: 5,731,947
[45] Date of Patent: Mar. 24, 1998

[54] ELECTRICITY TAPPING APPARATUS WHICH AUTOMATICALLY TURNS ON THE SLAVE UNITS BY SENSING THE POWER STATUS OF THE MASTER UNIT

[76] Inventor: Fuminori Hirose, 1-72-9 Higashiyama, Hirakata City Osaka pref., Japan

[21] Appl. No.: 600,555

[22] Filed: Feb. 13, 1996

[30] Foreign Application Priority Data

Jan. 19, 1995 [JP] Japan .................................. 7-041174

[51] Int. Cl.[6] ........................................ H02J 3/00
[52] U.S. Cl. .................................. 361/160; 307/38
[58] Field of Search .......................... 361/166, 160; 307/38, 41, 141

[56] References Cited

U.S. PATENT DOCUMENTS 3,416,001  12/1968  Fistell ................................ 307/38
5,120,983  6/1992  Sämann ............................... 307/38
5,424,903  6/1995  Schreiber ........................... 361/166
5,563,455  10/1996  Cheng ................................. 307/41

Primary Examiner—Fritz Fleming

[57] ABSTRACT

A first power plug for inserting in a wall outlet and a tapping table consisting of more than one outlet for accepting power plugs of slave units are connected by an electric cord, a switch is provided in the cord, the switch is ON/OFF controlled by a switch control means which detects through a second power plug connected with a service outlet of a master electronic equipment power voltage provided in parallel with power voltage to be supplied to the master electronic equipment; the switch control means controls whether to provide slave units connected with outlets of the tapping table with power supply voltage when the master electronic equipment is energized.

7 Claims, 4 Drawing Sheets 5,731,947

ELECTRICITY TAPPING APPARATUS WHICH AUTOMATICALLY TURNS ON THE SLAVE UNITS BY SENSING THE POWER STATUS OF THE MASTER UNIT

FIELD OF THE INVENTION

The present invention relates to an electricity tapping apparatus for supplying power to plural units of equipment at home or office.

BACKGROUND

An electricity tapping facility has been used in order to increase the number of outlets or to extend a cord for driving a plurality of office equipments, home appliances or audio visual equipments, by attaching a plug of the tapping facility to a wall outlet or a floor outlet. Along with the progress of the office equipment, audio visual system, communication equipment, there has arisen a need to turn a number of electronic equipments ON, not only a single unit, at a same time, if a system consisting of plural equipments is to be put into operation. For example, when using a personal computer one has to turn ON the switches of slave units such as a CRT display, a printer, plural units of hard disk drive, a floppy disk drive, a scanner, etc. immediately before or after turning the power supply to the personal computer, or a master unit, ON. Turning switches one by one by hand is quite a troublesome work. To alleviate such inconvenience, some personal computers and other equipments have in their back panel a service outlet(s) for supplying power via main switch of such master equipment to peripheral, or slave unit(s). A slave unit may receive electric supply by attaching its power plug to service outlet of the master equipment. In this case, if main switch(es) of the slave unit(s) is kept ON, power supply to the slave unit(s) starts as soon as main switch of a personal computer is turned ON; thus the switching work on slave unit(s) at each time of use can be eliminated. In practice, however, the number (or, electrical capacity) of peripheral units available on the service outlet is restricted by the capacity of main switch of the personal computer, or a master unit, furthermore the space affordable for such service outlet(s) on a master unit is limited. In most cases, around two service outlets with the total maximum capacity 300 W are provided. Which may serve for use of a CRT display and a printer; in practical cases where more slave units are linked, the accomodation of such service outlets does not satisfy the needs.

A practical example of such conventional setup is shown in FIG. 1, description of which is made in the following.

Numeral 1 denotes a personal computer, or a master electronic equipment, which receives power supply from a cord having a plug 6 which is attached to a wall outlet, via main switch 3 which is connected with a circuit board 7 of the personal computer and a service outlet 4. When a button 2 of the main switch 3 is pressed the main switch 3 is turned ON, and the circuit board 7 of personal computer 1 and the service outlet 4 are put into working condition. The service outlet 4 may be connected, within the electrical capacity of main switch 3, with a slave unit A, B, C or D; in FIG. 1, only a plug 10a of A equipment 8a is connected. Numeral 9a denotes main switch button of the equipment 8a. Other slave units B, C and D receive power supply from a separate tapping table 13. The tapping table 13 is comprised of a plug 11, which is to be attached to wall outlet, a cord 12 connected with the plug 11, and a plurality of outlets 14a, 14b, 14c(and 14d), each of which is connected with plug 10b, 10c and 10d, respectively, of electronic equipment B, C and D, which being the slave unit. Numerals 9b, 9c and 9d denote main switch buttons of respective equipment.

In the prior art setup described above, main switch button 9a of slave unit 8a is kept pressed in advance, and when the main switch 3 of personal computer 1, or master unit, is turned ON the slave unit 8a starts functioning at the same time. However, if the remaining slave unit B, C or D, or 8b, 8c or 8d, has to be put into operation, main switch button 9b, 9c or 9d, respectively, has to be pressed. When suspending the operation, same procedure is has to be done. Thus, at the start and the end of work, each of the slave units other than A, or 8a, requires a switch handling, which is not only troublesome but also is accompanied by risk of an error to be inadvertently forgotten when a work is ended. If one forgets turning switch OFF, the equipment is left with the power ON for the subsequent days causing a loss of energy and a danger; the risk is higher if there are many slave units involved.

The present invention aims to solve the problems with a prior art setup described above, and offers a convenient electricity tapping apparatus, functioning of which is interlocked with the main switch of an electronic equipment which is master unit, thereby eliminating the troublesome action of turning each of the main switches of slave units at each time when starting a work. Further, an electricity tapping apparatus according to the present invention prevents an inadvertent failure of turning the slave units OFF, and offers independent outlets for supplying electricity to electronic equipments which are slave units, without being restricted by the capacity of main switch of a master unit.

SUMMARY OF THE INVENTION

In order to attain the above described objective, a first constitution of an electricity tapping apparatus according to the present invention to be used for operating an electronic equipment, which works as a master unit and is equipped with a service outlet, and peripheral equipments which work as slave units is comprised of a first power plug for connecting with an electric outlet, a tapping table connected with both of the terminals of said first power plug, and having more than one outlet for connection with a power plug of electronic equipment which is a slave unit, a switch provided between said first power plug and said tapping table, for turning ON and OFF the power supply to the tapping table, a second power plug to be connected with the service outlet, which outlet is turned into live state during the time when a master unit is in operation, and a switch control means for controlling said switch ON and OFF by detecting through said second power plug whether said service outlet is in live state or not.

In the above described constitution, the switch control means is a relay activated by a voltage given from said second power plug, and said switch may be driven by this relay.

A second constitution of an electricity tapping apparatus according to the present invention to be used for operating an electronic equipment, which works as a master unit and is equipped with a service outlet, and peripheral equipments which work as slave units is comprised of a first power plug for connecting with an electric outlet, a tapping table connected with both of the terminals of said first power plug, and having more than one outlet for connection with a power plug of electronic equipment which is a slave unit, a switch provided between said first power plug and said tapping table, for turning ON and OFF the power supply to the tapping table, a second power plug having one terminal to be connected to the service outlet, which outlet is turned into live state during the time when a master unit is in operation, and a switch control means for controlling said switch ON and OFF by detecting through said second power plug whether said service plug is in live state or not, wherein the electricity for working said switch controlling means is obtained from said first power plug.

In the second constitution, said switch control means may be constituted in such a way that one of the terminals of said first power plug is connected with a first terminal of the relay coil via first diode, and the other terminal of said first power plug is connected with a first terminal of the relay coil via second diode, wherein the polarity of said first diode and said second diode is arranged to avoid the short-circuit between the two terminals of said first power plug, and a second terminal of said relay coil is connected with said second power plug, thereby said switch may be driven by this relay.

In addition to what is described above, the constitution may further comprise a second relay for controlling the conduction between said second power plug and said first power plug, which relay functions on the voltage between the terminals of said first power plug.

Further in the second constitution, said switch control means may obtain power from the voltage of said first power plug through an insulated transformer.

The present invention realizes, in the first constitution, by plugging in the first power plug and the second power plug respectively to a wall outlet and a service outlet of master equipment, an independent power supply to peripheral equipments, or slave units, from a separate outlet without being restricted by the capacity of main switch of master equipment, wherein the switching of the slave units is interlocked by a simple construction with the main switch of master electronic equipment, thereby an inadvertent failure of turning ON and OFF the peripheral units is avoided.

Further, the present invention enables, in the second constitution, attaching of two plugs to one service outlet at a same time, as a result of reduction in the number of terminals of the power plug be inserted in said service outlet to one; in this way the number of peripheral equipments, or slave units, that can be linked together can be additionally increased.

PREFERRED EMBODIMENTS OF THE INVENTION

In the following, a first embodiment of the present invention is described in detail referring to FIG. 2 and FIG. 3.

Figure 2:
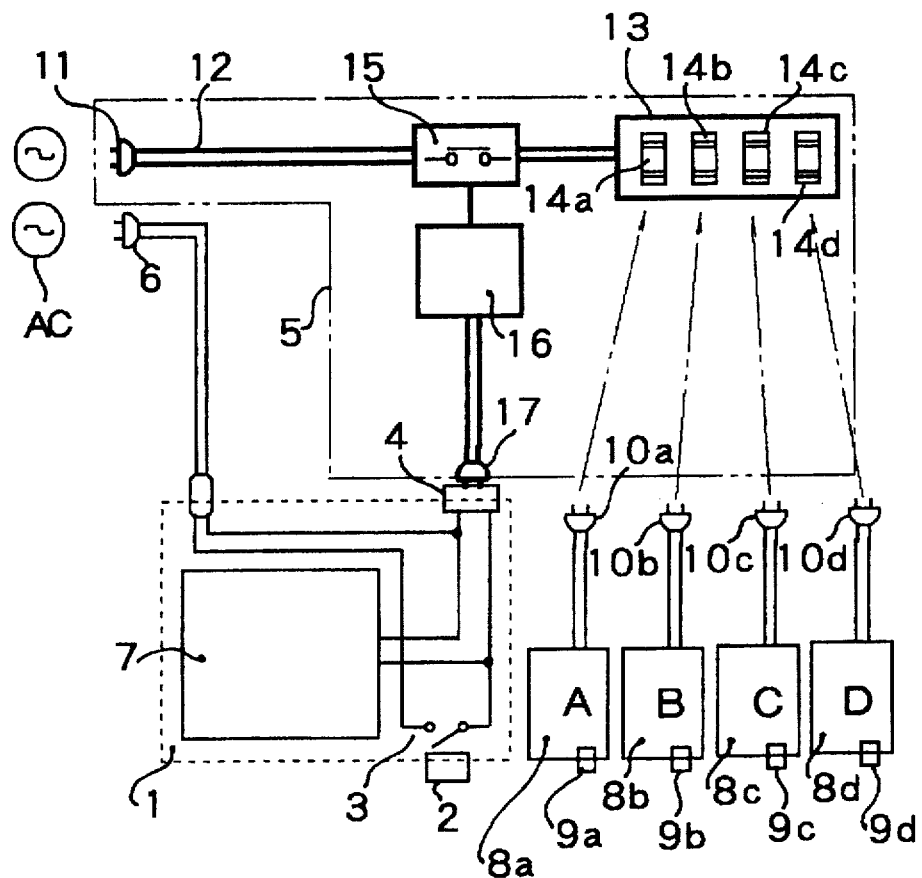
FIG. 2 Block diagram showing connection of equipments with an electricity tapping apparatus according to a first embodiment of the present invention.
Figure 3:
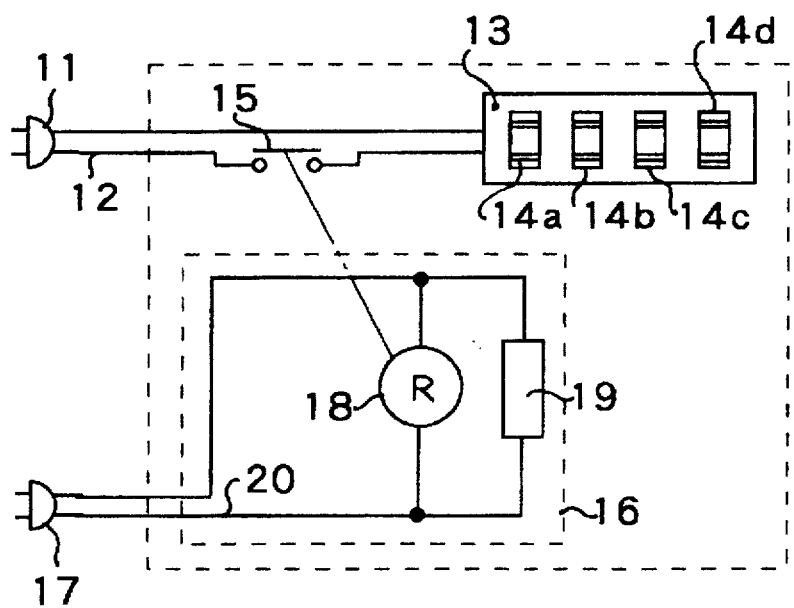
FIG. 3 Circuit diagram of an electricity tapping apparatus according to a first embodiment of the present invention.

FIG. 2 is block diagram showing the total setup of an electricity tapping apparatus according to a first embodiment of the present invention, a master equipment and slave units to be connected to the electricity tapping apparatus, FIG. 3 a practical circuit diagram of the electricity tapping apparatus according to the present invention. An electronic equipment 1, or a master equipment, receives electric power from a power plug 6 to be attached to a wall outlet via a cord connected with the plug, and the power is delivered to a circuit board 7 of the master equipment and a service outlet 4 through a main switch 3. Numeral 2 denotes a button of the main switch 3, with a press of the button the master equipment 1 is put into operation and the service outlet 4 is supplied with the source voltage. Around the master equipment 1 are electronic equipments A, B, C and D, or slave units 8a, 8b, 8c and 8d, each of which has power plugs 10a, 10b, 10c and 10d, respectively. Each of the units is provided with power switch button 9a, 9b, 9c and 9d to turn ON and OFF the respective unit. Electricity tapping apparatus according to the present invention is connected to such equipments. The electricity tapping apparatus 5 according to the present invention is comprising of a first power plug 11 to be attached to an ordinary electric outlet; a tapping table 13 connected to the power plug 11 with a cord 12 and provided with a group of more than one outlet(s) 14a, 14b, 14c and 14d to accept power plugs 10a, 10b, 10c and 10d of electronic equipments or slave units; a switch 15 provided in the way of electric cord 12 connecting said power plug 11 and tapping table 13 for turning the power supply to tapping table 13 ON and OFF; a second power plug 17 to be attached to the service outlet 4 of electronic equipment 1, or a master equipment; and a switch control means 16 for controlling said switch 15 ON and OFF by detecting through the second power plug 17 whether said service outlet 4 of equipment 1 is in live state or not.

Operation of the first embodiment is described below. Second power plug 17 of an electricity tapping apparatus according to the present invention is attached to service outlet 4 of master equipment 1, and a group of outlets 14a through 14d are connected with power plugs 10a through 10d of electronic equipments A through D, or slave units 8a through 8d; when, switch buttons 9a through 9d of equipments 8a through 8d are already pressed to keep the respective switch in ON state, but the equipments are not supplied with electricity. Under such situation, when main switch 3 of master equipment 1 is turned ON, the service outlet 4 is supplied with a voltage, and said switch control means 16 detects the voltage to turn ON the switch 15 which controls the supply of electricity to a group of outlets 14a through 14d, thus the power supply is started to peripheral electronic equipments A through D, or slave units, connected with the tapping table which is formed with a group of outlets 14a through 14d.

Now, description is made on FIG. 3, which shows a practical circuit. The switch control means 16 is comprised of a relay 18 and a noise killer 19; wherein relay 18 works on a current supplied from the second power plug 17 attached to the service outlet 4 while the service outlet is in live state, noise killer 19 is a component intended to prevent the reverse electro-motive force of the relay 18, diode or any other components that serve this purpose may be used in this place. Normally-open switch contacts 15 of relay 18 are provided between the first power plug 11 and the group of outlets 14a through 14d of the tapping table. When a voltage is applied on the second power plug 17, relay 18 is actuated to close the switch 15, and the electricity is supplied to the tapping table 13; hence to the peripheal equipments. Namely, the switch control means 16 detects whether or not the service outlet 4 is in live state and conducts the ON/OFF control of switch 15.

As described above, an electricity tapping apparatus according to the first embodiment of the present invention is quite a convenient tool in that by turning in advance the power switches of peripheral equipments, or slave units, ON, all of these equipments are put into operation at the same time when the main switch of a master electronic component is turned ON. Furthermore, as the electric power is supplied only when a master equipment is in operation, there can not be any inadvertent error of forgetting to turn OFF the power of peripheral equipments, and as the electricity for the peripheral units is supplied from an independent electric outlet separated from the one for the master equipment, there is no restriction in the power comsumption which stems from the limited capacity of main switch or service outlet in the master equipment.

In the above described embodiment, each of the tapping table 13, switch contacts 15 and switch control means 16 may be provided either as an independent body or housed together in a single casing. The relay 18 is described in the exemplary circuit as the one which works on AC, however a DC relay may be used; when, an AC input from the second power plug 17 may be rectified by diode and then smoothed with electrolytic capacitor (not illustrated).

Figure 8A:
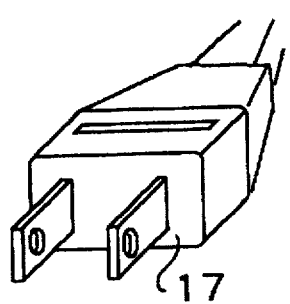
FIG. 8A Perspective view of a power plug according to a first embodiment of the present invention.
Figure 8B:
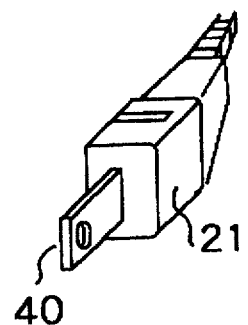
FIG. 8B Perspective view of a power plug according to a second, a third and a fourth embodiments of the present invention.
Figure 1:
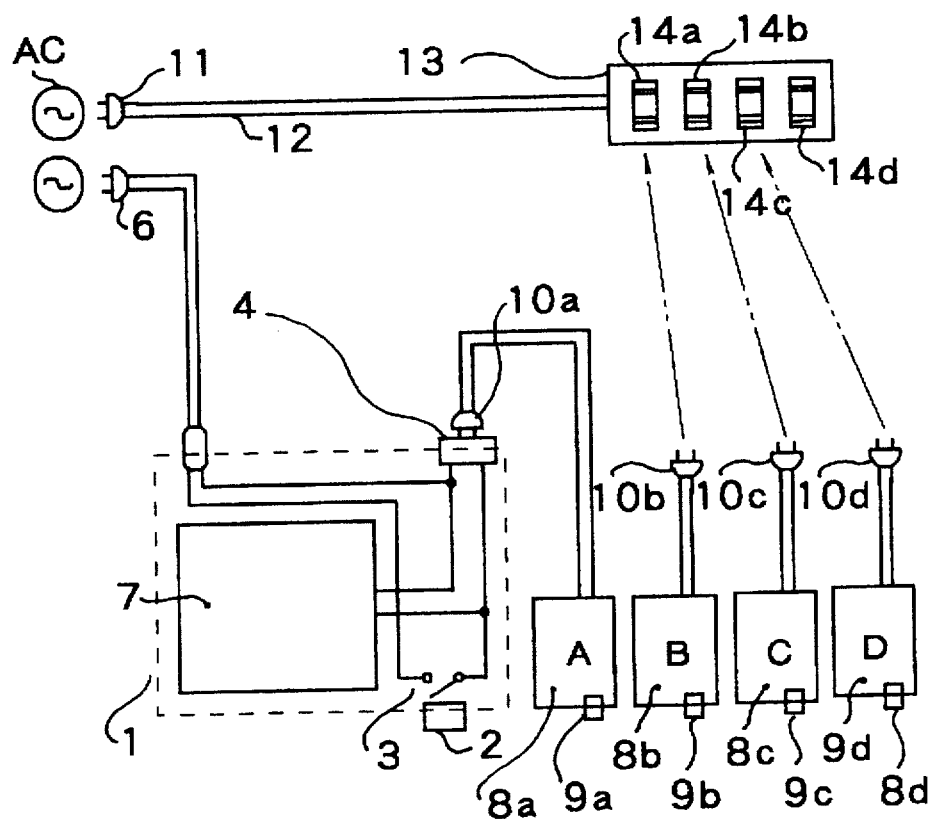
FIG. 1 Block diagram showing connection of equipments with a prior art electricity tapping facility.
Figure 4:
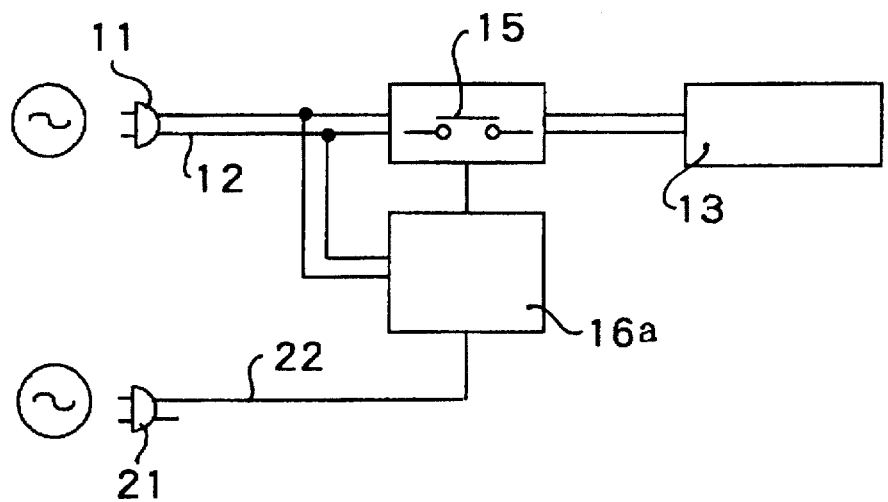
FIG. 4 Block diagram of an electricity tapping apparatus according to a second embodiment of the present invention.
Figure 5:
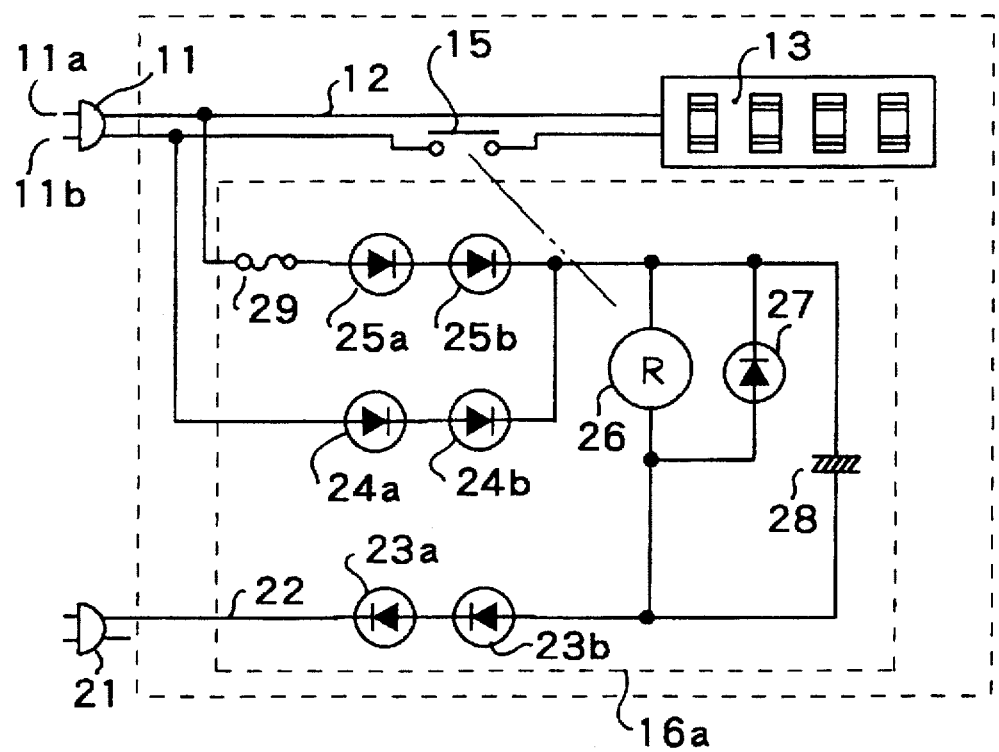
FIG. 5 Circuit diagram of an electricity tapping apparatus according to a second embodiment of the present invention.

Now in the following, a second embodiment of the present invention is described referring to FIG. 4, FIG. 5 and FIG. 8. FIG. 4 is block diagram of the second embodiment, FIG. 5 shows circuit diagram of a practical example of the second embodiment. In FIG. 4, there are a second power plug 21 and a switch control means 16a connected to the plug 11 for controlling the ON/OFF work of a switch 15 provided in the way of a cord 12 between the first power plug 11 and a tapping table 13, in almost the same way as in the first embodiment. What are different from the first embodiment are that the second power plug 21 is not a normal one 17 as shown in FIG. 8A, but is a one having only one terminal 40, as shown in FIG. 8B and that the power source for the switch control means 16a is shifted to the first power plug. A preferred shape for the second power plug is as shown in FIG. 8B, however a plug of FIG. 8A can serve the purpose if one line of a cord is cut off or one terminal is disconnected from cord. Then, referring to FIG. 5 which shows a practical circuit diagram, diodes 23a, 23b are connected to a power cord 22(one line only) attached to one terminal 40 of the second power plug 21, and diodes 24a, 24b and diodes 25a, 25b are connected respectively to each line of a power cord 12 attached to the first power plug 11; thus a total of six diodes is provided under a specified polarity arrangement in order that current flows from either one of the terminals of the first power plug towards the second plug. If the withstanding voltage is high enough, one diode for each line would do. Diodes 23a, 23b may be omitted. As the diodes 24a, 24b and the diodes 25a, 25b are provided in reverse polarity viewed from both terminals of the first power plug, as illustrated, the source voltage given on both terminals of the first power plug is never short-circuited. Connected between the diode line 24a, 24b and the diode line 25a, 25b are relay 26, diode 27 for preventing the reverse electro-motive force and electrolytic capacitor 28 for smoothing. Numeral 29 denotes a fuse against a short-circuit in case diode is broken. These diodes 23, 24, 25, relay 26 and capacitor 28 constitute the switch control means. The switch 15, being the contacts of relay 26, is normally open, and is provided in the way to the tapping table 13, like the case with the first embodiment.

In the above constitution according to the second embodiment of the present invention, when master equipment 1 is turned ON and its service outlet is also turned into live state, in case the terminal 11a of first power plug 11 and the service outlet in which a terminal of second power plug 21 is inserted happened to be in the same phase, the diodes 25a, b do not work, whereas the diodes 24a, b works when the remaining terminal 11b is in positive polarity allowing electric current to flow via relay 26, through diodes 23a, b to the second power plug 21, and the relay 26 functions. Namely, in whichever mouth of the service outlet the second power plug is inserted, hence whichever polarity the cord 22 is brought to, either one of the diode lines 24a,b or 25a,b works so long as the service outlet is in live state, and relay 26 functions. Therefore, said switch control means 16a consisting of diode, relay and capacitor can detect through a terminal of the second power plug inserted to said service outlet that the service outlet is in live state, and can perform the ON/OFF control of power supply to said tapping table 13 by means of switch 15.

As described in the above, a second embodiment of the present invention makes it possible, on top of the effects implemented in a first embodiment, to attach in a same time two units of an electricity tapping apparatus according to the present invention to one outlet of a master equipment, enabling to link more additional number of peripheral equipments, or slave units, because said power plug to be inserted in the service outlet is made to be one-terminaled as illustrated in FIG. 8B.

Figure 6:
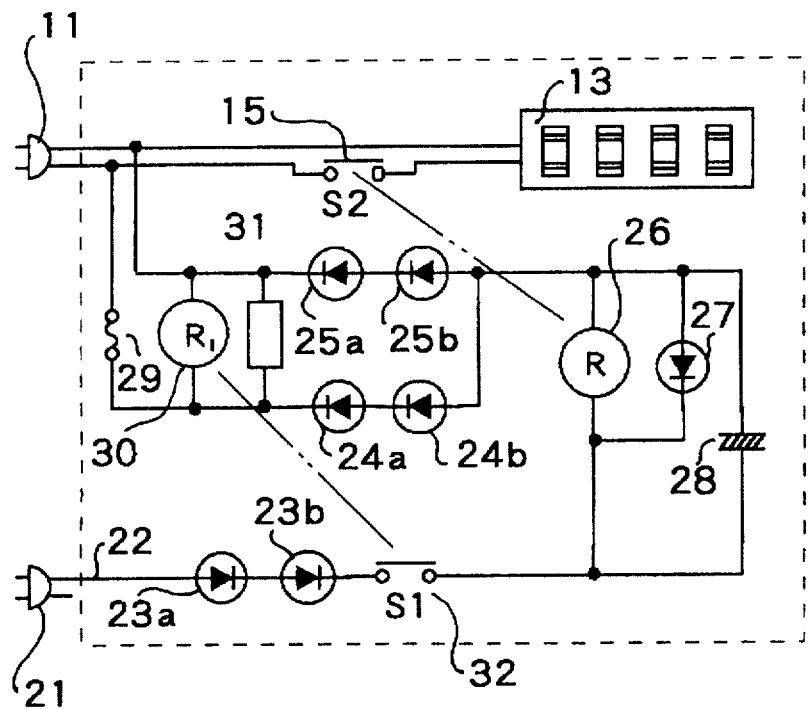
FIG. 6 Circuit diagram of an electricity tapping apparatus according to a third embodiment of the present invention.

Next, a third embodiment of the present invention is described referring to FIG. 6. In a second embodiment as shown in FIG. 5, an operator might feel an electric shock if the first power plug 11 is attached to an electric outlet and the second power plug is not inserted to the service outlet, and terminal of the latter plug is touched; or the second power plug 17 is inserted to the service outlet of a master equipment and the first power plug 11 is not inserted to an electric outlet, and the latter plug is held by hand. FIG. 6 illustrates an improved setup.

In FIG. 6, another relay(R1) 30 and a noise killer 31 are provided, in addition to what is shown in FIG. 5, between the two terminals of the first power plug 11 via a fuse 29, and electricity flowing between the first power plug and the second power plug is blocked by normally-open contacts 32 of the relay 30. Namely, suppose the second power plug 21 is attached first and terminal of the first power plug 11 is touched by hand, electricity from the second power plug 21 is blocked by the contacts 32 of relay 30 which is not put into operation unless the first power plug 11 is attached to an electric outlet, therefore unable to reach human body. Thus a probability of causing an electric shock is reduced. Needless to mention, regarding the rest of the function items, the third embodiment is the same as the second embodiment.

Figure 7:
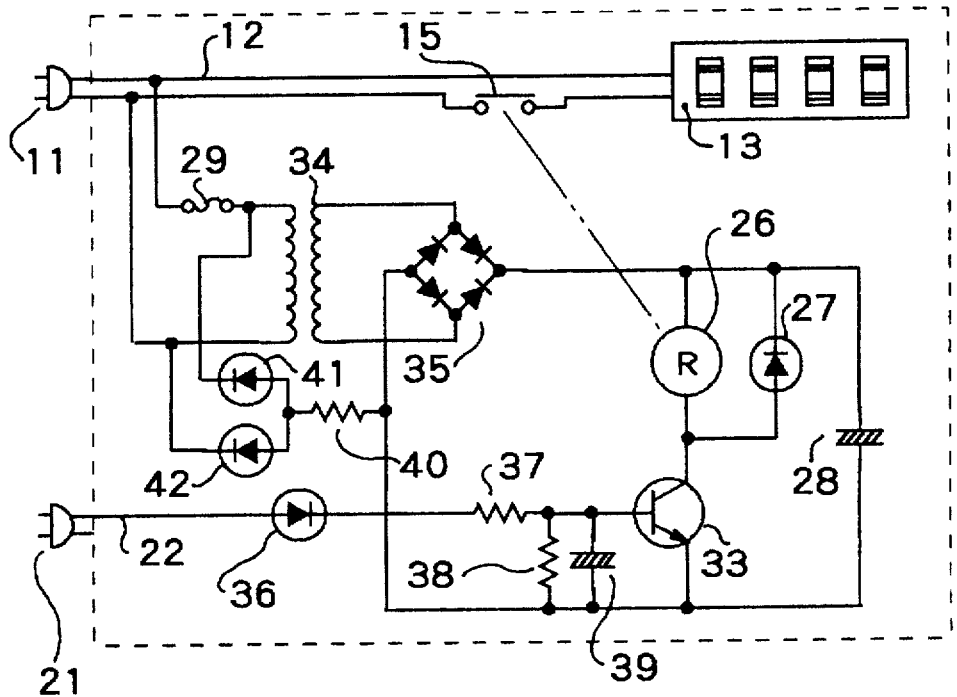
FIG. 7 Circuit diagram of an electricity tapping apparatus according to a fourth embodiment of the present invention.

Now in the following, a fourth-embodiment of the present invention is described referring to FIG. 7. Even in the third embodiment, a possibility of feeling an electric shock still remains if the first power plug 11 is attached in the first place and then the second power plug 21 is touched; the fourth embodiment is to improve this point. FIG. 7 shows practical circuit diagram of a fourth embodiment of the present invention. Electric cord 12 from the first power plug 11 is connected with the primary side of transformer 34 via fuse 29 for the purpose of insulation. The output is rectified by a bridge diode 35 connected to the secondary side, and smoothed by an electrolytic capacitor 28. Thus the fuse 29, transformer 34 and a group of diodes 35 constitute a power supply for the switch control means. The rectified positive voltage is connected to the collector of switching transistor 33 via a parallel circuit of relay 26 and diode 27 connected in reverse polarity.

Meanwhile, a single line cord 22 from the second power plug 21 is connected to the base of switching tansistor 33 via diode 36 and resistor 37. Between the base and emitter of switching transistor 33 are a resistor 38 and an electrolytic capacitor 39, and the emitter is connected with the rectified negative voltage. The emitter is also connected with one terminal of power plug 11 via a high ohmic resistor 40 and a diode 41, as well as with another terminal of power plug 11 via the high ohmic resistor 40 and a diode 42.

The operation with the above constitution is described in the following. When the first power plug 11 is attached to a power supply, the secondary AC voltage of transformer 34 is applied to a group of diodes 35 to be rectified, and supplied to one terminal of the parallel circuit of relay 26 and diode 27, and to the collector of transistor 33, after smoothed by electrolytic capacitor 28. And then, the second power plug 21 is attached to the service outlet. When a master equipment is put into operation and a voltage is applied to the service outlet, a weak electricity flows to either of the terminals of the first power plug 11, via a channel from diode 36, resistor 37, resistor 38 through high ohmic resistor 40 and diode 41, or through high ohmic resistor 40 and diode 42. When, a positive potential is applied to the base of switching transistor 33 with the potential between both ends of resistor 38 to turn the switching transistor ON, and the relay 26 connected to the collector is supplied with electricity making switch 15 ON. Thus in the same way as in each of the cases of said embodiments, the electricity is supplied to tapping table 13. Even if the second power plug 21 is attached to the service outlet earlier, as there is no voltage applied on the collector of switching transistor 33, the transistor 33 does not turn ON until the first power plug 11 is connected to a power supply, and secondary voltage of transformer 34 is rectified and supplied to. Furthermore, suppose either one of the first or the second power plugs, 11 or 21, is attached to a power supply and the other is not attached to be left free, and one touches to the free plug, one does not feel an electric shock because the electricity is very weak controlled by the high ohmic resistor 40.

When a master equipment suspends its operation, the second power plug 21 is not supplied with any voltage, rendering the switching transistor 33 OFF, relay 26 is not supplied with electricity, switch 15 is turned OFF to stop the electricity to tapping table 13; thus the power supply to slave equipments is suspended. In place of the switching transistor 33, a device other than transistor, such as a thyristor may be used. When the resistance value of the high ohmic resistor 40 is raised higher, the possibility of electric shock goes lower; in this case the transistor circuit may be provided with an additional constitution.

As described above, a fourth embodiment according to the present invention implements by simple electronic circuitry an electricity tapping apparatus having a high safety of handling, in addition to the effects as provided in the second and the third embodiments.

As described in the foregoing descriptions, the present invention implements an electricity tapping apparatus that offers quite a convenient feature in that, if power switches of peripheral equipments which are to work as slave units are turned ON in advance, the slave units are put into operation by simply switching ON an electronic equipment which is to act as a master equipment; thereafter, when the master equipment is switched ON or OFF the slave units are also turned ON or OFF accordingly. Moreover, as the ON/OFF operation of slave units is linked with that in a master equipment there is can be no error of forgetting to turn the slave units OFF. In addition, as electric power to slave units is supplied from an independent electric outlet other than that of a master equipment, there is no worry for the power supply to slave units to be restricted by the electrical capacity of main switch or service outlet of a master equipment.

Although the present invention has been described in terms of the presently preferred embodiment, it is to be understood that such disclosure is not to be interpreted as limiting. Accordingly, it is intended that the appended claims be interpreted in accordance with the true spirit and scope of the invention.

What is claimed is:

1. An electricity tapping apparatus, comprising a first power plug for connecting with an electric outlet, a tapping table connected with both of the terminals of said first power plug, and having more than one outlet for connection with a power plug of an electronic equipment which is a slave unit, a switch provided between said first power plug and said tapping table, for turning ON and OFF the power supply to said tapping table, a second power plug to be connected with a service outlet disposed on the body of an electronic equipment provided in parallel with power voltage to be supplied to said electronic equipment, being a master unit, which service outlet turns into live state when said electronic equipment, a master unit, is energized and a switch control means for controlling said switch ON and OFF by detecting through said second power plug a power voltage in said service outlet disposed on the body of said electronic eqipment, a master unit, provided in parallel with the power voltage to be supplied to said electronic equipment, a master unit.

2. An electricity tapping apparatus according to claim 1, wherein the switch control means is a relay which works on a voltage supplied from said second power plug, and said switch is actuated by this relay.

3. An electricity tapping apparatus, comprising a first power plug for connecting with an electric outlet, a tapping table connected with both of the terminals of said first power plug, and having more than one outlet for connection with a power plug of an electronic equipment which is a slave unit, a switch provided between said first power plug and said tapping table, for turning ON and OFF the power supply to said tapping table, a second power plug having one terminal to be connected with a service outlet disposed on the body of an electronic equipment provided in parallel with power voltage to be supplied to said electronic equipment, being a master unit, which service outlet turns into live state when said electronic equipment, a master unit, is energized and a switch control means for controlling said switch ON and OFF by detecting power voltage incurred between the one terminal of said second power plug and either one of the terminals of said first power plug, which power voltage being a voltage provided in parallel with power voltage to be supplied to said electronic equipment a master unit.

4. An electricity tapping apparatus according to claim 3, wherein said switch control means is constituted so that one terminal of said first power plug is connected to a first terminal of a relay coil via first diode, whereas the other terminal of said first power plug is connected to the first terminal of said relay coil via second diode, the polarity of said first diode and said second diode are provided in an arrangement with which the short-circuit between the two terminals of said first power plug is avoided, and a second terminal of said relay coil is connected to said second power plug; and said switch is driven by the relay.

5. An electricity tapping apparatus according to claim 3, wherein said switch control means employs a voltage of said first power plug via insulated transformer as power source.

6. An electricity tapping apparatus according to claim 3, wherein the power supply for operating said switch control means is delivered from said first power plug.

7. An electricity tapping apparatus comprising a first power plug for connecting with an electric outlet, a tapping table connected with both of the terminals of said first power plug, and having more than one outlet for connection with a power plug of an electronic equipment which is a slave unit, a switch provided between said first power plug and said tapping table, for turning ON and OFF the power supply to the tapping table, a second power plug having one terminal to be connected with a service outlet disposed on the body of an electronic equipment, a master unit, which turns into live state when said electronic equipment, a master unit, is energized.

a switch control means for controlling a relay for driving said switch, a first terminal of coil of said relay is coupled with one of the terminals of said first power plug via first diode as well as with the other terminal of said first power plug via second diode, the polarities of said first diode and said second diode being provided avoiding the short-circuit between the terminals of said first power plug, while a second terminal of coil of said relay is coupled with the one terminal of said second power plug, and a second relay which works on voltage between the terminals of said first power plug, for controlling the conduction between said first power plug and said second power plug; wherein said switch control means controls ON and OFF of said switch by detecting under the control of said second relay through said second power plug an electric current flowing from either one of the terminals of said first plug via said first or second diode to the coil of said first relay during the time when said service outlet disposed on the body of said electronic equipment, a master unit, is in live state.

* * * * *